United States Patent Office 2,882,997
Patented Apr. 21, 1959

2,882,997
FILTER MATERIAL

Stanton B. Smith and Arvo J. Juhola, Pittsburgh, Pa., assignors to Pittsburgh Coke & Chemical Company, Pittsburgh, Pa., a corporation of Pennsylvania No Drawing. Application April 26, 1954
Serial No. 425,720

13 Claims. (Cl. 183—44)

The present invention relates to aerosol filtration media efficient in stopping power for liquid smoke particles and finely divided dusts. It is an essential part of this invention that this high efficiency be obtained with a minimum of resistance to air flow through the filter mat.

Recent scientific investigations have shown that this requirement is best met when the active filtration agent is a randomly dispersed interlacing system of extremely fine filaments. The air resistance of a filter will be dependent upon two fundamental quantities: (1) the proportion of free air space within the filter which determines the amount of space through which air is permitted to pass freely and (2) the area of solid surface, that is, fiber surface, that air must contact in passing through the filter. In the filtration of aerosol particles, and especially of liquid smokes, any contact of a suspended particle with a solid surface will result in the removal of the particle from the air stream; thus aerosol-solid collisions will be 100% effective. Since the suspended particles tend to move with the air stream and are also diverted in their path when the air stream is so diverted, the problem of filtration reduces to an efficient contacting of the air with a maximum surface presented as uniformly as possible to the air stream so that no suspended aerosol particle may escape collison with the solid surface, in this case, with fiber surface. It may then be seen that the use of fibers of large diameter, having a low surface to volume ratio, will raise filter resistance without appreciably increasing filter efficiency since the bulk of the air stream carrying the aerosol particles with it may be diverted around the filament. However, if extremely minute fibers are employed, the air stream will be split up so completely that no aerosol particles may escape contact with fiber surface, even though the open passages between the fibers are very much larger than the diameter of the suspended particles. This latter feature also prevents the gross plugging of the filter media by accumulation of particles in sharp contrast to a membrane containing extremely fine holes of diameter smaller than the aerosol particles which would become plugged almost immediately on contact with the suspended material.

For optimum filtration efficiency, it might be inferred that a filter consisting totally of super-fine filaments would be most desirable; however, the mechanical aspects of such a material would be very undesirable since the fine fibers lack physical strength and would tend to mat together to the point that very high air resistance would be built up. It is consequently the essence of this invention to so balance the proportion of active filtering fibers, inert fibers and bonding fibers that a practical compromise is reached in respect to physical strength, filtration efficiency and air resistance to effect a unique solution to the problem of aerosol filtration.

It is known that asbestos possesses a high filtration efficiency per unit of air resistance when completely dispersed by virtue of its extremely fine ultimate subdivision. This property of asbestos has been utilized in filter papers made by wet processes in which the raw asbestos fiber is vigorously beaten in the presence of wetting and dispersing agents so that the fiber bundles are completely broken up and the ultimate asbestos filaments entirely dispersed. In this process, the asbestos fibers are severely shortened and weakened, the final fiber length being less than 1 mm. in general.

However, it was not known that satisfactory filtration efficiency could be obtained when only a small fraction of the asbestos was so defibered and dispersed and that the asbestos could be opened on conventional dry process machines, such as carding machines or air deposition devices, for this purpose.

Accordingly, it is an object of this invention to prepare aerosol filtration media from asbestos fibers of staple length containing a small amount of finely divided asbestos.

Though the problem of subdivision is particularly acute in the case of asbestos, it is by no means confined to this fiber. Other fibers, even of a synthetic nature, such as ultrafine glass wool, are very low in elasticity and during the process of manufacture tend to become matted and clumped together so that uniform dispersion of these fibers by a dry process presents a difficult problem. It is consequently the further object of this invention to disperse such synthetic fibers by dry-process machinery to form an efficient filtering media.

It is a further object to obtain an aerosol filter material formed of randomly disposed adhesively bonded fibers, some of these fibers being filtering fibers which are disengaged from each other and extremely fine, while the predominant amount of the fibers has a relatively great length and constitutes interlocking means to produce a substantially integral fibrous self-sustaining structure.

It is another object of this invention to prepare such an aerosol filter material using a blend of fibrous materials including asbestos staple fibers, a thermoplastic staple fiber, and an inert non-thermoplastic staple fiber filler.

It is still another object of this invention to prepare such an aerosol filter material by opening the material on conventional carding machines, waste machines, or air desposition devices, or impact mill devices.

Another object is to prepare filter media efficient in stopping power for liquid smoke particles and/or finely divided dust while still possessing high air permeability and mechanical strength, both wet and dry.

Still further objects and the entire scope of applicability of the present invention will become apparent from the detailed description given hereinafter; it should be understood, however, that the detailed description and specific examples, while indicating preferred embodiments of the invention are given by way of illustration only, since various changes and modifications within the spirit and scope of the invention will become apparent to those skilled in the art from this detailed description.

The essential filtering agent used is asbestos staple fiber (dry process), ultra-fine glass wool in staple length, or air-drawn synthetic fibers, such as nylon (e.g., polyhexamethylene adipamide), Terylene (e.g., polymerized ethylene glycol terephthalate) or acrylonitrile polymers in staple lengths. Of these materials, asbestos has been found to be definitely superior to the other fibers, in respect to ease in processing.

In the preferred embodiment of this invention, the fibers are of staple fiber length in contrast to wet beaten short fibered materials used to produce filter papers. In fact, the fibers must be sufficiently long to be adequately handled in mixtures on a carding or waste machine. In the case of synthetic fibers, they need not be treated as vigorously as asbestos as they are normally more fully dispersed when obtained.

In addition to the filtering agent, an essential material of the present invention is a thermoplastic staple fiber, such as Vinyon HH (a vinyl chloride-acetate copolymer with the vinyl chloride predominating) or Plasteca (a plasticized cellulose acetate) or saran (a polymer of vinylidene chloride). Of these thermoplastic materials, we have found Vinyon HH superior to any other tested.

There must also be present an essentially inert non-thermoplastic staple fiber filler, such as viscose rayon, comber cotton, or cotton thread waste which supplies physical strength and may be referred to hereinafter as structural fiber. Other inert fibers which do not contribute to structural strength may also be included, which serve only to separate the active filtering fibers by interposing themselves between the finer filaments so that dispersion of these fine filaments is not lost by compression of the fibrous mat. Such fibers may be relatively short in length, the only restriction being that they not be too short for the type of machine being employed since this results in the loss of fiber from the system.

In the case of asbestos fiber a novel condition exists in which the asbestos fibers function in a dual role, the fine ultimate fibers acting as the filtering agent while the remaining portion of undispersed fiber acts as a structural fiber.

In normal operation, the blend contains fibrous asbestos, such as Canadian Chrysotile (e.g., grade 3F) or Southern Rhodesia (C. and G. No. 1) or other active filtering fiber in an amount from 10 to 50%, depending on the filtration efficiency desired, 20 to 50% thermoplastic staple fiber, such as Vinyon HH or Plasteca, and from 10 to 75% of inert non-thermoplastic staple fiber. The blends are made by feeding the hand-mixed fibers or picker laps of blends of the proper weights and proportions through a waste or carding machine one or two times. In this process, the asbestos is somewhat defibered and shortened. By thorough processing, a uniform web, with a low degree of orientation, is obtained from the card or waste machine and the web can be pressed under heat sufficient to soften the thermoplastic bonding material to obtain the finished pad directly.

The preferred method, however, comprises feeding the blended fibers from the card or waste machine to a random air deposition machine, such as the Rando-Feeder and Rando-Webber combination. This machine is capable of dispersing the fibers separately in a high velocity air stream and depositing them on a screen until a layer of desired depth, e.g., 2 to 50 mm., is built up. The screen may be continuously moving so as to produce a randomly oriented web by a continuous process.

Though filtering materials may be made by wet processes using asbestos either with or without fillers, such materials are generally low in strength, excessively stiff, and high in pressure drop when made in thicknesses such as those herein described. It is therefore apparent that certain real advantages result from the use of a dry process of the type described. In order to realize the advantages of low air resistance, high filtration efficiency and high strength, both wet and dry, it is essential that the pads be made by such a dry process.

In testing such materials, it is accepted practice to pass an air stream through a well defined area of filter material, which has suspended in it extremely fine droplets, about .3 micron in diameter, of dioctyl phthalate. A standard smoke generator and test device have been designed by the Chemical Corps and were used in determining the efficiency of filtration, which is measured as the percentage of smoke passing the filter material. In the preferred practice of this invention, the DOP smoke penetration is not over 2% and, ideally, is less than .04%.

In the preferred method of operation, using the Rando-Webber, it is possible to use fibers as short as 0.25 inch, although the use of somewhat longer staple fibers up to 2 inches is satisfactory.

The webs are made up into sheets, pads, or bats of multiple layers, preferably from about 1 to 15 cm. in thickness, by appropriate stacking procedures prior to use, depending on the desired final thickness.

Heat sealing is performed in conventional manner between heated platens or between heated rolls. The temperature should be carefully controlled so as not to destroy the fibrous nature of the thermoplastic material, e.g., the temperature should be high enough to soften this material and may be high enough to cause the material to melt and lose its fibrous nature but it should not be so high as to decompose the fiber. With Vinyon HH, a temperature of 90° to 180° C. is adequate. The pressure also should be regulated so that too dense a pad is not obtained. Pressure of about 50 lbs./sq. inch applied for about .5 to 5 minutes normally is adequate, depending on the temperature employed.

A web containing thermoplastic, i. e., heat bonding, fiber, but no filtering agent, can be superimposed on the filtering web before heat pressing to impart a smoother, abrasion resistant, water repellent, softer or colored surface, if desired.

The thickness, density, and internal sealing are, of course, controlled to obtain the desired filtration efficiency.

The process of opening up the fibers and preparing the web results in the formation of some free divided fibers having a fineness between 0.01 and 2.5 microns. When using glass fibers as the filtering material, the same preferably have a diameter of from 0.2 to .75 micron. The ratio of interlocking structural fibers of staple length to total filtering fibers is in the range of about 9 to 1 to about 4 to 1, e.g., 6.5 to 1 when using asbestos fibers in the amounts called for. It is essential to the success of the invention that the structural and filter fibers be used within the ranges specified above.

A more complete understanding of this invention and the operation thereof may be had by reference to the following illustrative examples of actual operation in accordance with the invention.

*Example I*

A mixture of 25% viscose rayon (3 denier 1 9/16" staple length), 25% Vinyon HH (3 denier 1½" staple length), and 50% 3F Canadian Chrysotile asbestos textile grade was fed in two passes through a two stage Kirkman and Dixon Waste Machine and then in one pass through a Rando-Feeder and Rando-Webber in combination. A 5.1 oz./yd.$^2$ web was obtained. Hereinafter, webs made by the above-outlined process will be referred to as Rando webs. Two thicknesses of this web were pressed at 116° C. and a very mild pressure with a preheat time of 5 minutes to obtain a pad 2.4 mm. thick which weighed 4.2 grams. The penetration of a dioctyl phthalate (DOP) liquid smoke of 0.3 micron diameter at a linear velocity of 3.2 meters/minute with an air resistance of 25 mm. of water was .007%. The water pressure drop of 25 mm. at 32 l./min. per 100 cm.$^2$ was well within the Chemical Corps specification of 65 mm.

*Example II*

A similar mixture of fibers was used to that in Example I but the web was one of 3.8 oz./yd.$^2$. Three thicknesses of this web were pressed at 120° C. and at a pressure (about 1000 lb./sq. inch) sufficient to obtain a thickness of 1.8 mm. and weight 3.9 grams. The pressure change was 18 mm. and the DOP penetration was 1.32%. When the pressure was sufficient to obtain a thickness of 3.4 mm., a 0.8% DOP penetration was obtained and the change of pressure was 19 mm.

*Example III*

Three thicknesses of Rando web from 37.5% industrial grade asbestos, 37.5% cotton thread waste, and 25% Vinyon HH were covered with two thicknesses of 75% cotton thread waste and 25% Vinyon HH. The resulting bat was molded at 90° C. under 1200 lb./sq. inch after a preheat of 10 minutes to give a product 1.47 mm. thick having a 0.018% DOP penetration. The water pressure drop was 48 mm.

An identical composition but having a thickness of 2.57 mm. had a 0.001% DOP penetration. The layers were pressed separately and then assembled for the test.

*Example IV*

A fibrous mixture consisting of 3.5 g. of glass fibers ranging in diameter from .5 to .75 micron diameter and 5.5 g. of cotton flock were fed to a Weber hammermill. These mixed hammermilled fibers now somewhat shortened in length and thoroughly intermixed were placed in a layer between two thin webs totaling 11 g. of cotton and Vinyon staple fiber blend. This "sandwich" was then fed against a multitoothed roll rotating at high speed which discharged the separate disengaged fibers into a high velocity air stream. A screen placed in the path of the fibers collected the completely intermixed mass of fibers which was removed and placed between heated platens fitted with opposing 3 mm. studs for 5 min. at 160° F. The resulting pad had a pressure drop of 73 mm. of water at above test conditions and a DOP penetration of .25%.

*Example V*

Alternate layers of glass fiber having a diameter of .75 to 1.5 microns, Vinyon HH and Acrilan in the proportions 34.5%, 50%, and 15.5%, respectively, were fed to a double (4-stage) waste machine( Kirkman & Dixon) to mix the blend uniformly. Portions of the fiber mixture were fed against the revolving toothed drum and dispersed in an air stream, as in Example IV, and from fiber mats totaling 8 g. in weight were superimposed and pressed between flat heated platens 15 min. at ca. 150° F. to form a circular pad 127 cm.² in area. The resulting pad gave a pressure drop of 23 mm. water and DOP penetration of 1.9%.

A pad formed in identical manner, except that only 33% of glass fibers of finer diameter, .5 to .75 micron was used, gave a pad having a resistance of 52 mm. water and a DOP penetration of .03%.

We claim:

1. An aerosol filter material formed of randomly disposed adhesively bonded fibers, certain of said fibers being active filtering fibers of a fineness of between 2.5 and .01 micron diameter, a majority of these filtering fibers being disengaged from one another and randomly oriented in respect to each other, other of said fibers being thermoplastic fibers and inert staple fibers and constituting interlocking means having a thickness and resiliency sufficient to form spaces between said filtering fibers and to produce a substantially integral self-sustaining structure, the fibers used being a mixture comprising (1) 10 to 50% filtering fibers, (2) 20 to 50% thermoplastic fibers, and (3) 10 to 75% inert staple fibers.

2. The filter material of claim 1, wherein the filtering fibers are asbestos and the thermoplastic fibers are a vinyl chloride-acetate copolymer.

3. The filter material of claim 1 in which the filtering fibers are glass filaments of less than 2 micron average fiber diameter.

4. The filter material of claim 1 in which the filtering fibers are asbestos.

5. The filter material of claim 1 in which the filtering fibers are glass filaments.

6. An aerosol filter material formed of randomly disposed adhesively bonded fibers, certain of said fibers being glass filaments of between 2 micron and 0.01 micron average fiber diameter, a majority of the glass fibers being disengaged from one another and randomly oriented in respect to each other, other of said fibers being thermoplastic vinyl chloride-acetate copolymer fibers and inert staple fibers and constituting interlocking means having a thickness and resiliency sufficient to form spaces between said glass fibers and to produce a substantially integral self-sustaining structure, the fibers used being a mixture comprising (1) 10 to 50% of the glass filtering fibers, (2) 20 to 50% of thermoplastic vinyl chloride-acetate copolymer fibers, and (3) 10 to 75% inert staple fibers.

7. The filter material of claim 6 wherein the glass filaments are from 0.2 to 0.5 micron fiber diameter.

8. The filter material of claim 1 in which the filtering fibers are glass filaments and the thermoplastic fibers are vinyl chloride-acetate copolymer fibers.

9. The filter material of claim 1 in which the filtering fibers are asbestos fibers.

10. The filter material of claim 1 in which the filtering fibers are asbestos fibers and the thermoplastic fibers are vinyl chloride-acetate copolymers.

11. A process for making an aerosol filter material comprising the steps of (1) blending filtering fibers having a fineness of between 2.5 and .01 micron diameter, and spacer fibers, some of which are thermoplastic and the remainder of which are inert staple fibers, the fibers used in the mixture comprising (a) 10 to 50% filtering fibers, (b) 20 to 50% thermoplastic fibers, and (c) 10 to 75% inert staple fibers, (2) opening up the filtering fibers in said blend to disengage a majority of said filter fibers from one another and randomly orient the same with respect to the fibers in said blend, and (3) forming and heating said blend under pressure sufficient to bond the filtering fibers with said thermoplastic fibers and produce a substantially integral self-sustaining filtering structure.

12. The process of claim 11, wherein said filtering fibers are opened up by dry means.

13. A process for making an aerosol filter material comprising the steps of (1) blending filtering fibers having a fineness of between 2.5 and 0.01 micron diameter, and spacer fibers, some of which are thermoplastic and the remainder of which are inert staple fibers, the fibers used in the mixture comprising (a) 10 to 50% filtering fibers, (b) 20 to 50% thermoplastic fibers, and (c) 10 to 75% inert staple fibers, (2) disengaging a majority of the said filter fibers from one another and randomly orienting the same with respect to the spacer fibers in said blend, and (3) forming and heating said blend under pressure sufficient to bond the filtering fibers with said thermoplastic fibers and produce a substantially integral self-sustaining filtering structure.

References Cited in the file of this patent

UNITED STATES PATENTS

| | | |
|---|---|---|
| 2,507,827 | Stafford et al. | May 16, 1950 |
| 2,521,985 | Lang et al. | Sept. 12, 1950 |
| 2,587,234 | Sebok et al. | Feb. 26, 1952 |
| 2,614,655 | Katz | Oct. 2, 1952 |
| 2,688,380 | MacHenry | Sept. 7, 1954 |
| 2,708,982 | McDuff et al. | May 24, 1955 |
| 2,765,515 | Knudson | Oct. 9, 1956 |

FOREIGN PATENTS

| | | |
|---|---|---|
| 482,137 | Great Britain | Mar. 24, 1938 |
| 474,457 | Italy | Sept. 24, 1952 |